United States Patent
Misler et al.

(10) Patent No.: US 12,373,795 B2
(45) Date of Patent: Jul. 29, 2025

(54) SYSTEM AND METHOD OF DYNAMICALLY RECOMMENDING ONLINE ACTIONS

(71) Applicant: THE TORONTO-DOMINION BANK, Toronto (CA)

(72) Inventors: Matthew Walter Misler, Mississauga (CA); Blake Andrew Dudgeon, Milton (CA)

(73) Assignee: THE TORONTO-DOMINION BANK, Toronto (CA)

( * ) Notice: Subject to any disclaimer, the term of this patent is extended or adjusted under 35 U.S.C. 154(b) by 336 days.

(21) Appl. No.: 17/670,169

(22) Filed: Feb. 11, 2022

(65) Prior Publication Data
US 2023/0259883 A1    Aug. 17, 2023

(51) Int. Cl.
*G06Q 10/1053* (2023.01)
*G06N 5/022* (2023.01)
*G06N 5/04* (2023.01)

(52) U.S. Cl.
CPC ......... *G06Q 10/1053* (2013.01); *G06N 5/022* (2013.01); *G06N 5/04* (2013.01)

(58) Field of Classification Search
CPC ....... G06Q 10/1053; G06N 5/022; G06N 5/04
See application file for complete search history.

(56) References Cited

U.S. PATENT DOCUMENTS

| | | | |
|---|---|---|---|
| 10,262,279 B2 | 4/2019 | Barnfield et al. | |
| 11,120,403 B2 | 9/2021 | Pande et al. | |
| 2017/0206503 A1* | 7/2017 | Harris | G06F 16/3344 |
| 2017/0236095 A1* | 8/2017 | Schreiber | G06Q 10/1053 705/321 |
| 2017/0308811 A1 | 10/2017 | Kumar | |
| 2017/0344927 A1 | 11/2017 | Coletta et al. | |
| 2018/0039946 A1* | 2/2018 | Bolte | G06Q 50/2057 |
| 2018/0232751 A1* | 8/2018 | Terhark | G06Q 10/063118 |
| 2019/0066023 A1 | 2/2019 | Von Jan et al. | |
| 2019/0303798 A1* | 10/2019 | Xie | G06Q 50/01 |
| 2020/0074311 A1 | 3/2020 | Li et al. | |
| 2020/0160252 A1 | 5/2020 | Sahni et al. | |
| 2021/0056651 A1 | 2/2021 | Sengupta et al. | |
| 2021/0065325 A1 | 3/2021 | Alkan et al. | |
| 2021/0357867 A1* | 11/2021 | Walker | G06Q 10/1053 |

FOREIGN PATENT DOCUMENTS

| | | |
|---|---|---|
| WO | 2020/003325 A1 | 1/2020 |
| WO | 2021/092165 A1 | 5/2021 |

OTHER PUBLICATIONS

De Oliveira Lima, Jaimel, and Elias Oliveira. "Combining clustering and regression models for recommending researchers." Symposium on Knowledge Discovery, Mining and Learning (KDMiLe). SBC, 2021. (Year: 2021).*

(Continued)

*Primary Examiner* — Brendan S O'Shea

(57) ABSTRACT

The present disclosure generally relates to a computer device, method and system utilizing machine learning for capturing and analyzing profile data communicated across a computing environment including but not limited to: each user's profile, online behaviors and career progression path and provides dynamic recommendations of online actions to be performed to reach a desired target state.

17 Claims, 4 Drawing Sheets

(56) References Cited

OTHER PUBLICATIONS

N. Guenole et al. (2018), "The Business Case for AI in HR", IBM Smarter Workforce Institute, pp. 1-36.

M. Nocker et al. (2019), "Big Data and Human Resources Management: The Rise of Talent Analytics", 'Soc. Sci. 2019, 8, 273, pp. 1-19.

A. Mohammed (2019), "HR Analytics: A Modern Tool in HR for Predictive Decision Making", Journal of Management, vol. 6, Issue 3, pp. 51-63.

* cited by examiner

SYSTEM AND METHOD OF DYNAMICALLY RECOMMENDING ONLINE ACTIONS

FIELD

The present disclosure generally relates to a computerized method and system utilizing machine learning for providing dynamic recommendations of online actions to reach a target state based on analyzing profile data.

BACKGROUND

Employees of a company or entity do not have a good line of sight on their career prospects and how they can progress other than human advice, which may be prone to biases and inaccuracies. Recommendations for next steps and any reasoning for same are currently based on local management or coach feedback. This can lead to unpredictable decisions and many unknowns for employees. This may also introduce biases based on personal judgement in which human beings decide when or how an employee's career profile status within a company will change.

Prior methods of providing recommendations for next steps to employees regarding their progression, have involved a highly manual, unpredictable and inaccurate process, which applied a very heavy penalty on employees by not providing them with a holistic view of the data and a defined path for progression.

It would be desirable to have a computerized system and method that provides ability to dynamically generate, in an effective way, a visualization of how to change profile statuses via online action recommendations.

SUMMARY

In at least some aspects, the computerized system and method presented provides actionable recommendations presented on a graphical user interface of a career analytics platform application provided on a client computing device and enables improved predictability, accuracy and a mechanism to automate and learn from existing career related data for all users of the platform. In at least some aspects, there is provided a mechanism for collecting and using data about all employees to measure, predict and assist employees in providing automated and dynamic recommendations with next steps in their careers via an interactive graphical user interface. In at least some aspects, recommendations include a machine learning technique of digesting prior employee's data and automatically determining patterns of similarities between employees using linear regression modelling in order to provide and present recommendations for online actions to be performed on a client computing device.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer system for automated online recommendations for subsequent online user actions. The computer system also includes a processor configured to execute instructions; a non-transient computer-readable medium may include instructions that when executed by the processor cause the processor to: receive and apply profile attributes of a plurality of users may include career related information as input to a machine learning model, the profile attributes further defining a historical progression of actions taken online by each user over a past time period to reach a current profile state within an entity. The system also includes instructions that when executed by the processor cause the processor to: cluster, using the machine learning model and based on the profile attributes of the plurality of users, to create grouped clusters of users within the entity having similar profile attributes within each cluster. The system also includes instructions that when executed by the processor cause the processor to: apply linear regression to the profile attributes of a first user from the plurality of users to estimate a function defining a progression pattern for the historical progression over the past time period to reach the current profile state. The system also includes instructions that when executed by the processor cause the processor to: determine for a second user, clustered in a same cluster for being similar to the first user, a recommendation for reaching the current profile state of the first user from an existing state of the second user, the recommendation based on the estimated function and may include a series of online actions to be performed by the second user to progress from the existing state to the current profile state of the first user. The system also includes instructions that when executed by the processor cause the processor to: trigger a display of the recommendation on a graphical user interface of a client device for selection thereof and in response to an input indicative of the selection, provide the input to the machine learning model for updating subsequent recommendations. Other embodiments of this aspect include corresponding computer systems, apparatus, and computer programs recorded on one or more computer storage devices, each configured to perform the actions of the methods.

Implementations may include one or more of the following features. The computer system further comprises instructions that configure the processor such that based on the selection of at least one of the online actions, the instruction further cause the processor to: update the existing state to a target state defined by the current profile state of the first user. The profile attributes for the users provide metadata characterizing a career profile for each user and further may include: career related progression patterns for each of the users to move from a first profile state to another along with associated timing information; training status of each of the users obtained over the past time period; and performance metrics of each of the users within the entity and provided on the graphical user interface and certifications taken by each of the users. The computer system may include instructions that configure the processor for: accessing a database of career positions open for application within the entity and retrieving associated description metadata; performing natural language processing (NLP) on the description metadata, and the profile attributes of each of the first and second users to determine respective textual context of each; and further performing the recommendations based on a determined textual context of the description metadata of a particular career position having more than a predefined degree of match with the first and second user profile attributes. In at least some aspects, the machine learning model uses an unsupervised learning model. In some aspects, the recommendations include attributes from the first user's historical progression indicative of a career journey from a prior state to the current profile state for the first user, the attributes including an indication of actions performed may include: certifications completed, training status changes, and performance metrics. The instructions further configure the processor to: generate a reasoning for the recommendation and the corresponding online actions, the reasoning including features of the historical progression of the first user and an indication of a degree of similarity between the first user and the second user. The degree of similarity is dependent upon the clustering of users to determine the degree that the first user and the second user fall into a similar cluster. The target state is defined as a state that is between the existing state and the current profile state of the first user. Implementations of the described techniques may include hardware, a method or process, or computer software on a computer-accessible medium.

One general aspect includes a computer-implemented method of dynamically providing online recommendations for subsequent online user actions. The computer-implemented method also includes receiving and applying profile attributes of a plurality of users may include career related information as input to a machine learning model, the profile attributes further defining a historical progression of actions taken online by each user over a past time period to reach a current profile state within an entity. The method also includes clustering, using the machine learning model and based on the profile attributes of the plurality of users, to create grouped clusters of users within the entity having similar profile attributes within each cluster. The method also includes applying linear regression to the profile attributes of a first user from the plurality of users to estimate a function defining a progression pattern for the historical progression over the past time period to reach the current profile state. The method also includes determining for a second user, clustered in a same cluster for being similar to the first user, a recommendation for reaching the current profile state of the first user from an existing state of the second user, the recommendation based on the estimated function and may include a series of online actions to be performed by the second user to progress from the existing state to the current profile state of the first user. The method also includes triggering a display of the recommendation on a graphical user interface of a client device for selection thereof and in response to an input indicative of the selection, providing the input to the machine learning model for updating subsequent recommendations. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features of the disclosure will become more apparent from the following description in which reference is made to the appended drawings wherein.

DETAILED DESCRIPTION

While various embodiments of the disclosure are described below, the disclosure is not limited to these embodiments, and variations of these embodiments may well fall within the scope of the disclosure. Reference will now be made in detail to embodiments of the present disclosure, examples of which are illustrated in the accompanying drawings. Wherever possible, the same reference numbers will be used throughout the drawings to refer to the same or like parts.

Figure 1:
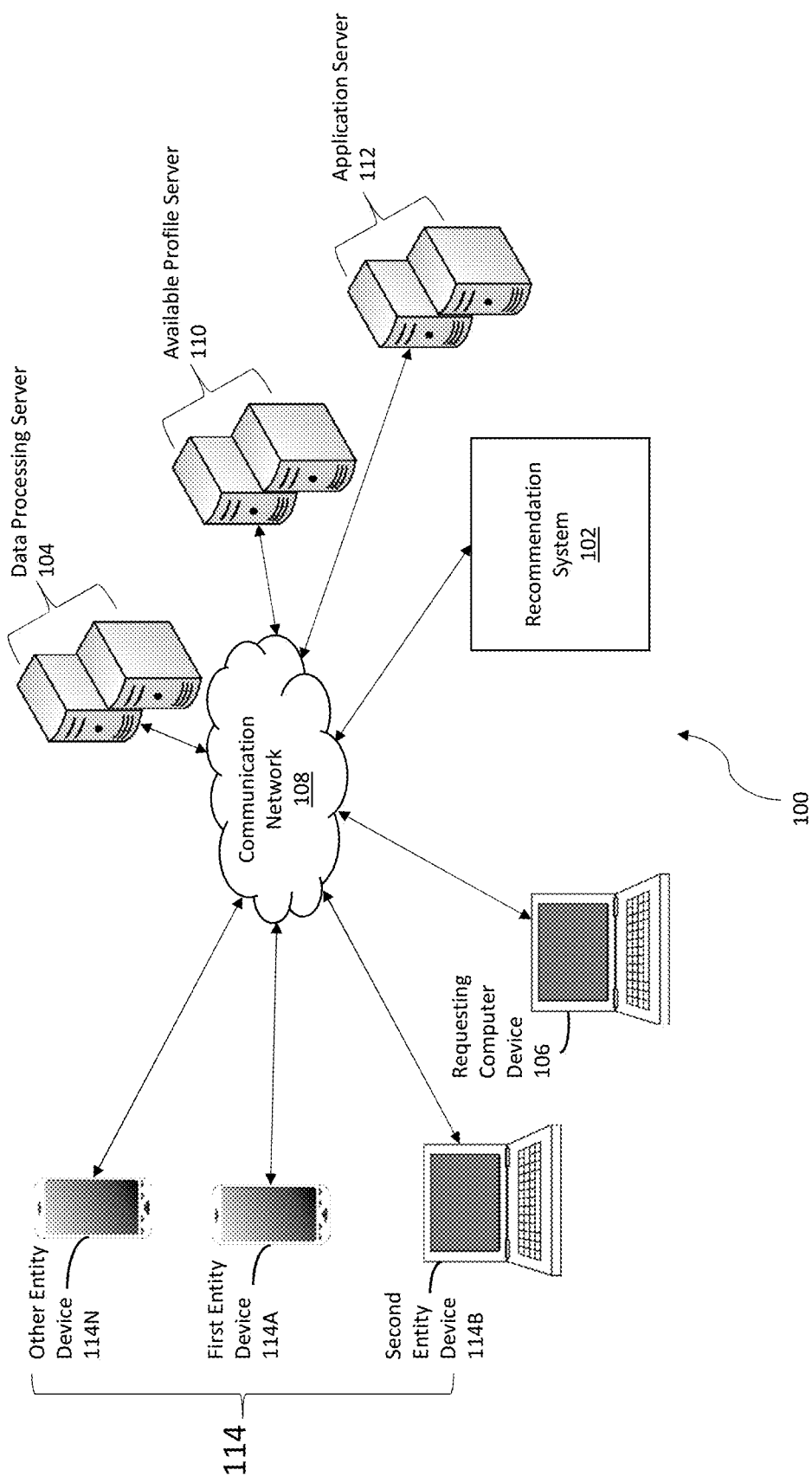
FIG. 1 is a diagram illustrating an example of a computing environment and an example computing device, shown as a recommendation system, communicating in a communication network and configured to output one or more recommended online actions for display on a graphical user interface via a requesting computer device, in accordance with one or more aspects of the present disclosure.

Referring to FIG. 1, shown is a computer environment 100, in accordance with an embodiment, which generally utilizes computer-implemented machine learning methods as described herein to process and understand large amounts of data communicated across the environment 100 such as from entity devices 114, in order to make dynamic and real-time recommendations, via a recommendation system 102 to a requesting computer device 106 as to recommended actions, including computerized online actions to be taken to progress a user of the requesting computer device 106 from a current profile state held within an entity to a future target profile state within the entity.

The data processing server 104 is configured to store, process and tag entity related data, such as user profile information received from the entity devices 114, which may include a first entity device 114A, a second entity device 114B and/or other entity device 114N.

The entity data communicated and analyzed includes user data such as profile data relating to users of entity devices 114 (e.g. career related user profiles and/or historical behaviour of users over a period of time with associated profile statuses) including but not limited to: jobs held, educational information, certifications or training information, roles held within organization, demographic data for the users, online activity data and other associated career information for users. In at least some aspects, the profile data may have metadata features including but not limited to: resume information (e.g. name and contact information), career objectives, career goals, education history, professional history, list of relevant skills, other accomplishments, volunteer activities, interests, educational transcript information, training information, mandatory training information (e.g. levels achieved of mandatory training within or external to an organization), elective education information (e.g. additional educational certifications obtained), performance metrics (e.g. within the entity and/or from the professional history), proficiency information (e.g. proficiency quizzes or surveys taken online), competency assessments (e.g. internal or external competency tests taken online or on any of the computing devices of the FIG. 1), etc.

The metadata features of the profile data may be obtained and attributed to a particular user of the device while any of the computing devices (e.g. entity devices 114 or requesting computer device 106) interacts with the environment 100. In at least some aspects, at least some of the profile data features may result from offerings provided by the application server 112 in response to career related requests, which may include providing one or more software applications 112 to the devices on the environment 100 in response to a request for modifying and updating the profile status of a user such as by requesting to update the resume, mandatory training, elective education, performance metrics, proficiency quiz, and/or competency assessments. For example, the software application provided may include additional training for a particular skill or interest or certification for an individual of an entity device 114 or the requesting computer device 106. In another example, the software application(s) provided by the application server 112 may be periodically requested by the entity as triggered by the data processing server 104, such as to require competency assessments, performance metrics, or proficiency tests which may be provided in the form of native software applications or links to software applications as provided by the application server 112 for the relevant computing device (e.g. entity device 114 or requesting computer device 106). In at least some aspects, the profile data may include, online behavior information related to a user relating to any of the resume information metadata such as contact information, education, training, performance metrics, etc. and/or interactions with websites associated with the entity for which the user currently holds a position within. Such computerized interactions may include requests for training or educational resources provided online from application server 112, browsing one or more websites relating to job postings such as may be provided by the available profile server 110, which provides profile information of available jobs for the entity and associated features such as education requirements, professional requirements, etc.

The data processing server 104 may be configured to retrieve, store and process the profile data for each user within the environment 100. In at least some aspects, the data processing server 104 may further be configured to extract from the data communicated across the environment 100, the relevant profile data for the recommendation system 102. The recommendation system 102 may, in at least some embodiments, be configured to notify the data processing server 104 as to the relevant features of the profile data to retrieve for each user in the environment 100 such that the data processing server 104 may in turn, extract and monitor for the key features of relevance.

As will be described, the recommendation system 102 may be further configured to utilize computerized statistical analytical methods to determine one or more key features of the profile data collected by the data processing server 104 based on the determined contribution of features to determining a profile change status for the user.

For example, the recommendation system 102 may indicate, based on statistical pattern recognition techniques (e.g. processed via the path determination module 307) the relevance of a profile status change (e.g. a given employee event such as a change in title, a department change for the employee, a new role within the entity, other hierarchical changes within the organization, etc.). The statistical pattern recognition techniques as considered by the recommendation system 102 (e.g. the path determination module 307) may include one or more features of relevance for a given profile status change, such as an employee event. Such features of relevance may include but not limited to: mandatory training, optional education, performance metrics, seniority, proficiency quizzes, competency assessments, etc.

Referring again to FIG. 1, the profile data may be obtained by the data processing server 104 and/or the recommendation system 102 from one or more computing devices (e.g. users interacting within the environment 100), such as a first entity device 114A, a second entity device 114B, and other entity device(s) 114N, generally referred to as entity device (s) 114. The entity may be a company, an institution, an office, or other organization, etc. The user for which profile information is gathered may be an employee of the entity, a contractor, an independent affiliate, a partner, or other affiliation with the entity. The environment 100 utilizes the profile data which may be stored and processed in the data processing server 104 and determines via the recommendation system 102 based on the profile data, profile progression patterns for each one of such users such as through various roles and/or titles held within the entity or profile status changes (e.g. employed, retired, on leave, etc.) and associated profile features (e.g. compensation, job description, role requirements, etc.) within the entity. In at least some aspects, the progression pattern information and derived user profiles are used by the recommendation system 102 to provide automated and dynamic recommendations to other users for subsequent next steps for progressing their profile status to a new elevated status in a future time period (examples of such recommendations are further shown in FIG. 3). In at least some aspects, this recommendation may include one or more recommended applications for download or use by the requesting computer device 106, to achieve the desired target status for the user, such applications accessed by the recommendation system 102 from the application server 112.

In at least some aspects, the recommendations provided to the requesting computer device 106 are relevant to users such as employees of the organization having profiles stored on the requesting computer device 106, defining how to progress and move up their profile status to a new target profile status within the entity via recommended online actions. The online actions may include recommended applications for downloaded to achieve such profile status changes which may be displayed on an interactive user interface of a requesting computer device 106. In some examples, the recommended actions may include online courses to be taken, online certifications, completions of online tasks, etc. In some aspects, the target state may be defined as at least one state above the user's current state within an entity, such as within a pre-defined hierarchical structure, as may be stored within the available profile server 110.

In generating the recommendations, in at least some aspects, the recommendation system 102 may also additionally consider additional information provided by the available profile server 110, which includes available roles within the entity for achieving the desired target state and associated descriptions for each such role. The available roles, and associated features for such roles (e.g. job description requirements, educational requirements, professional history requirements, skill requirements, identification information for the job) defining each role may be stored on the available profile server 110 (e.g. see also available profile state repository 212 in FIG. 2)

In at least some aspects, the recommendations provided by the recommendation system 102 are presented on a requesting computer device relating to a user via a graphical dashboard on the requesting computer device 106, such as via a graphical user interface of a career analytics computer application, either native or browser based on the client computing device. In some aspects, the online recommendations provided via the recommendation system 102 across the network 108 to the requesting computer device 106 further include downloaded applications or web links provided via accessing the application server 112 (e.g. as provided via the application retrieval module 208), to provide same to the graphical user interface on the requesting computer device 106 to perform said recommended online actions (e.g. access online courses or certifications to complete).

Computing devices shown in FIG. 1 are coupled for communication via communication network 108 which may comprise a wide area network (WAN), such as the Internet. Communication network 108 is coupled for communication with a plurality of computing devices, an example embodiment of such devices is shown in FIG. 1. Additional modules and devices that may be included in various embodiments are not shown in FIG. 1 to avoid undue complexity of the description. For example, additional requesting computer devices (beyond the requesting computer device 106) which request recommendations for online actions to be taken to change the profile status of a user of such device within an entity associated with the user, are not shown in FIG. 1 but may be envisaged in other embodiments.

Additionally, there may be intermediate devices from which the requesting computer device 106 communicates with the recommendation system 102 in other embodiments and such as not shown in the environment 100 of FIG. 1.

It is further understood that the communication network 108 is simplified for illustrative purposes. Communication network 108 may comprise additional networks coupled to the WAN such as a wireless network and/or local area network (LAN) between the WAN and computing devices shown in FIG. 1 (e.g. requesting computer device 106, recommendation system 102, etc.).

In the example of FIG. 1, requesting computer device 106 is a laptop computer and entity devices 114 are shown as a laptop computer or a mobile device. Other examples of computing devices for the requesting computer device 106 and/or the entity devices 114 and/or recommendation system 102 may include but not limited to: a tablet computer, a personal digital assistant (PDA), a laptop computer, a tabletop computer, a portable gaming device, a portable media player, an e-book reader, a watch, or another type of computing device. In the example of FIG. 1, the data processing server 104, the available profile server 110, and the application server 112 are shown as servers. Each of these is an example of a computing device having at least one processing device (e.g. a processor) and a memory (e.g. a storage device) storing instructions which when executed by the processing device configure the computing device to perform operations, examples of which are described herein. Similarly, each of the entity devices 114, the requesting computer device 106 comprise at least one processor, a communication interface, and a memory (e.g. data stores) storing instructions which when executed by the processor, implement the operations, examples of which are described herein. The requesting computer device 106, comprises at least one graphical user interface 107, providing a display (e.g. see FIG. 3) which is configured to display the online recommendations provided by the environment in FIG. 1 and receive input on the graphical user interface for communication with the environment 100 such as the recommendation system 102.

Figure 2:
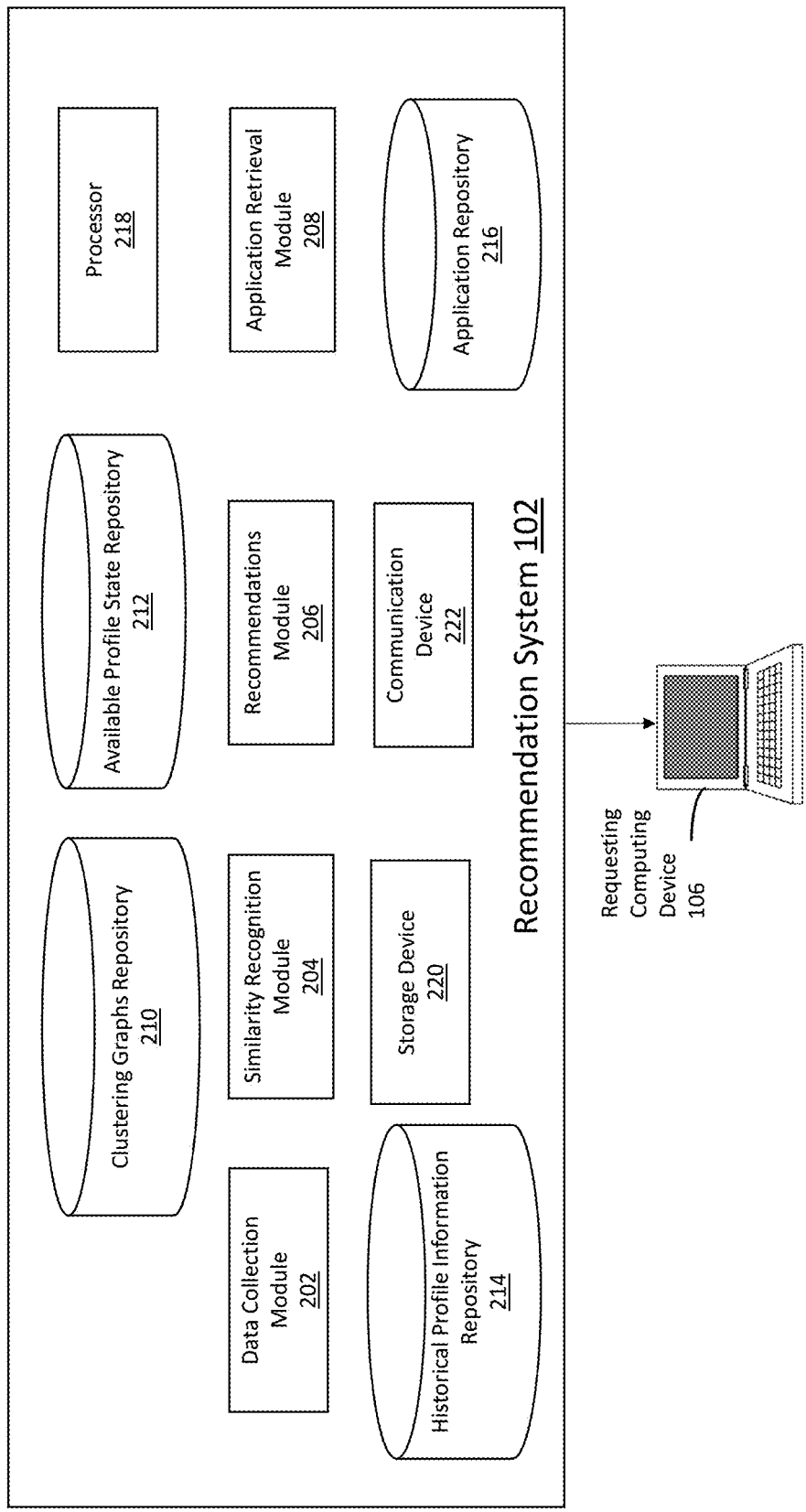
FIG. 2 is a diagram illustrating an example recommendation system of FIG. 1 in further detail, in accordance with one or more aspects of the present disclosure.

Referring to FIG. 2, shown is an example block diagram of the recommendation system 102, according to one embodiment in communication with the requesting computing device 106. The recommendation system 102 identifies relevant online actions to recommend to a user of a requesting computer device 106 based on: using unsupervised learning to determine clusters with users of similar profile attributes and utilizing the clusters to determine anomalies and recommendations for actions to be taken by the user based on similarities of the particular user to other users in the cluster. The online actions to be performed are further determined based on utilizing machine learning to build and continuously update profile attributes (e.g. progression patterns, mandatory and optional training status, education status, performance metrics, etc.).

In at least some embodiments, the recommendation system 102 comprises various modules and data stores for collecting profile attribute data on users (e.g. as communicated across the environment 100 of FIG. 1) relating to career information (e.g. known mandatory training, optional education, performance metrics, seniority, proficiency, competency assessments, identification information, etc.) and returns relevant recommendations for online actions in response to a query, such as a query to assist an employee career path dynamically received from a requesting computing device 106. Such a query may be received and processed via the communication device 222 which may also be responsible for communicating the associated recommendations to the requesting computing device 106.

The recommendation system 102 comprises a data collection module 202, a similarity recognition module 204, a recommendations module 206, an application retrieval module 208, a clustering graphs repository 210, an available profile state repository 212, a historical profile information repository 214, an application repository 216, one or more processors 218, one or more storage devices 220 and a communication device 222. The recommendation system 102 may include additional computing modules or data stores in various embodiments. Additional modules, processing systems, communication systems, user interfaces, and devices that may be included in various embodiments are not shown in FIG. 2 to avoid undue complexity of the description.

The one or more processors 218 may implement functionality and/or execute instructions within recommendation system 102. For example, processors 218 may be configured to receive instructions and/or data from storage devices 220 (e.g. memory) to execute the functionality of the modules shown in FIG. 2, among others (e.g. operating system, applications, etc.). The recommendation system 102 may also store data/information for subsequent access to storage devices 220. Some of the functionality is described herein.

Data collection module 202 is configured to collect and retrieve profile attribute data relating to users of the system 200, from historical profile information repository 214 or externally from the environment 100 shown in FIG. 1, such as from the data processing server 104. In some aspects, the data collection module 202 gathers profile attribute data including key indicators that would identify profile attributes of each user (e.g. employee of an entity) and provide this data to other modules in the recommendation system 102 for automatically generating recommendations of online actions to be performed by particular user, e.g. identifying opportunities for progress for the employees. The data collection module 202 may gather employee profile attributes such as mandatory and optional training status, performance metrics, seniority, assessments on proficiency tests, competency assessments, as well as progression patterns. The progression patterns may show how an employee has progressed through various roles (e.g. a first profile status) within an entity or institution and the types of events that have occurred between various roles (e.g. to reach a second profile status) within the entity or institution.

In one example implementation use of the recommendation system 102 of FIG. 2, a mechanism for collecting and using data to measure, predict and assist employees with the next steps in their careers by providing an automated method for gathering key data related to employees and generating automatic recommendation of opportunities for the employees including qualifications to complete (e.g. training/ courses) in order to progress to a next level of seniority or to a different career opportunity.

The similarity recognition module 204 receives the respective profile attributes associated with each user (e.g. from the data collection module 202). In at least some implementations, the similarity recognition module 204 utilizes unsupervised machine learning models to analyze and group together unlabeled data sets of profile information attributes. The similarity recognition module 204 thus determines a degree of similarity between nodes representing user profiles and finds the best grouping or clustering according to a criterion function. Such unsupervised machine learning models contain instructions which when run by the processor 218, discover hidden patterns or data groupings without any manual intervention, e.g. without the need for human intervention.

Figure 3:
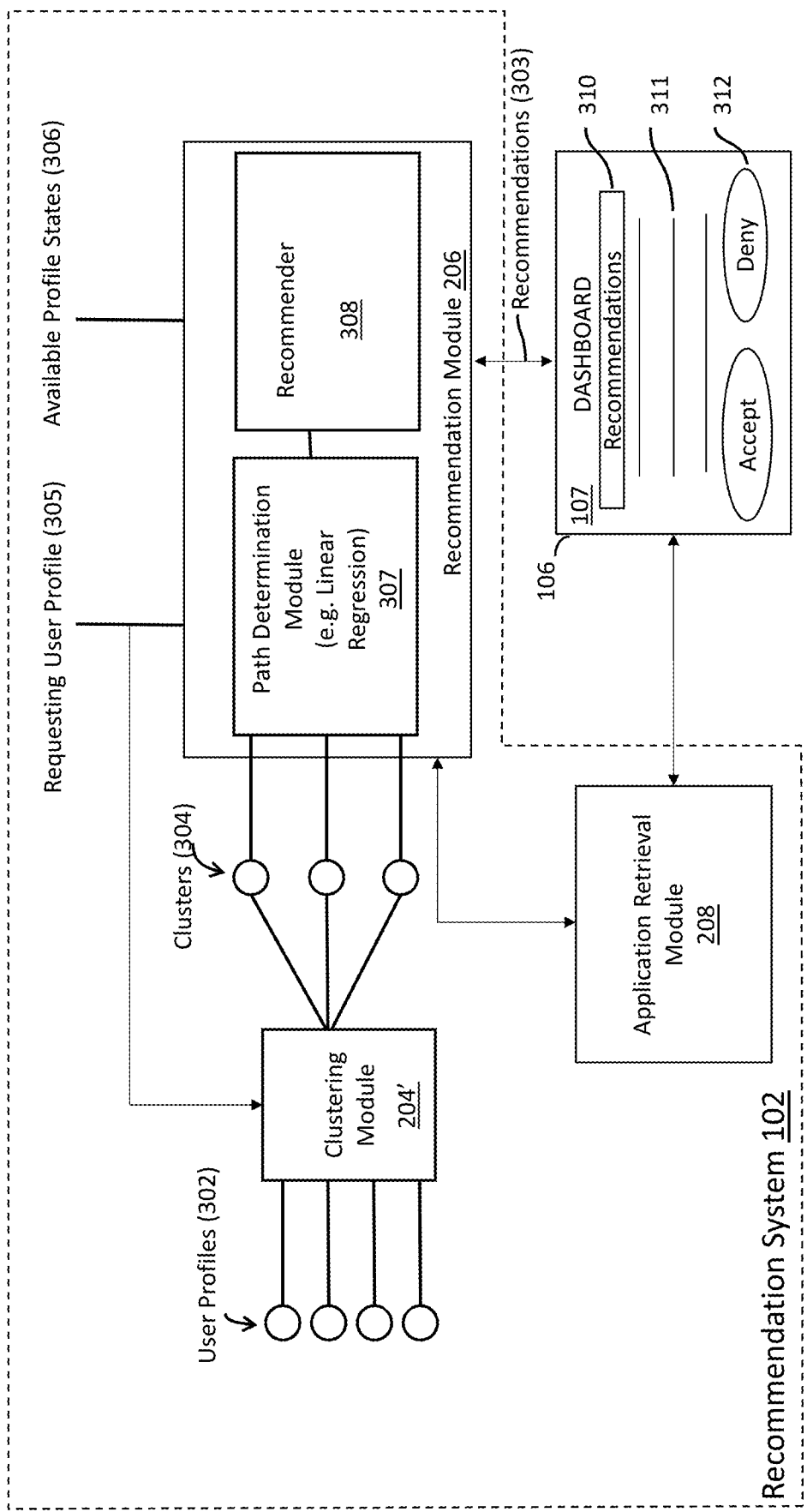
FIG. 3 is a diagram illustrating example communications between example components of the recommendation system and the requesting computing device of FIG. 1, in accordance with one or more aspects of the present disclosure.

An example implementation of at least some of the components of the recommendation system 102 of FIGS. 1 and 2, and the example communications therebetween is shown in FIG. 3. It is noted that a subset of components of the recommendation system 102 are shown in FIG. 3 for simplicity of visualization, in accordance with one embodiment.

Referring to FIG. 3, an example implementation of the similarity recognition module 204 of FIG. 2 is shown as a clustering module 204'. The clustering module 204' is configured to receive a set of user profiles 302 including profile attributes for each of the users as described herein based on historical data. For example, the user profiles 302 may be specific for particular types of users, e.g. architect profiles for architects within an entity. In some aspects, the profile attributes provided for the users may include all of the profile attributes collected by the recommendation system 102 as relevant to the environment 100, e.g. career related information. In other aspects, a subset of profile attributes are provided in the user profiles 302 information. In some embodiments, such a subset of profile attributes may be defined by way of the recommendation system 102 determining based on prior iterations of the recommendation system 102 and/or feedback from requesting computing devices 106 as to key profile attribute indicators, which are relevant to a given event. For example, the recommendation system 102 may determine using statistical methods key indicators (e.g. and corresponding profile attributes for users) that would identify the relevance of a given employee event based on historical data, e.g. known mandatory training, optional education, performance metrics, seniority, proficiency testing, etc.

The clustering module 204' may thus be configured to determine similar groups of users based on the user profiles 302 and provide as output a set of clustered groups of users, shown as clusters 304 in FIG. 3, in dependence upon determining a degree of similarity between users and grouping together users having more than a predefined degree of similarity within a same cluster. The clustering may thus be performed by calculating a distance or dissimilarity measure between nodes on a clustering graph. Such a clustering graph may be stored within a clustering graphs repository 210 shown in FIG. 2. Thus the clustering groups the user profiles 302 into segments of data such that similar data (e.g. having more than a defined degree of similarity) is grouped together by applying a distance calculation metric. The distance measures which may be applied by the clustering module 204' and/or the similarity recognition module 204 may include any one of: Euclidean distance, Manhattan distance, Cosine similarity, Pearson correlation, etc. The clustering which may be applied by the clustering module 204' to output the clusters 304 include but not limited to: centroid based clustering where the number of clusters are predefined (e.g. within the clustering graphs repository 210).

Referring to FIGS. 2 and 3, once it is determined which groups of users are similar to one another via the similarity recognition module 204 and/or the clustering module 204', that information is used by the recommendation module 206 to generate recommendations for a current user of a requesting computing device 106 having a requesting user profile 305 and seeking recommendations of one or more online actions to be performed (e.g. either sequentially or in another order) in order to achieve a desired target status (e.g. achieve a target status of another known user of the environment 100 in FIG. 1). The user may initiate a query for recommendations including an indication of a desired target state for the requesting user from the recommendation system 102, such as via a user interface 107 of the requesting computing device 106.

Thus, referring to FIGS. 2 and 3, the recommendations module 206 may comprise a path determination module 307 and a recommender 308. Once the users of the environment 100 (or a subset thereof such as users having a desired target state) are input as user profiles 302 and analyzed via the similarity recognition module 204 (or clustering module 204'), the output provides a grouping of similar users via the clusters 304. The clusters 304 are then fed into the recommendations module 206 along with the requesting user profile 305. In at least some embodiments, along with the requesting user profile 305, the recommendation module 206 also receives available profile states 306 for the environment 100. For example, this may include available possible target states which the requesting user profile 305 may be able to achieve depending on the actions taken. The available profile states 306 may include but not limited to a list of available jobs and associated attributes such as educational, geographical and/or professional requirements.

In at least some aspects, the recommendation module 206, accesses the available profile states 306 via a database of career positions open for application within the entity, such as the available profile state repository storing such information, and retrieves therefrom associated description metadata.

In one embodiment, the recommendations module 206 may first be configured to perform natural language processing (NLP) on the description metadata of available profile states and associated description along with the profile attributes of each of the requesting user profile 305 and corresponding subset of similar users as determined from the clusters 304 to determine respective textual context of each. and then performing the recommendations based on the determined textual context of the description metadata of a particular career position having more than a predefined degree of match with the first user profile (e.g. the requesting user profile 305) and second user profile attributes (e.g. similar users determined via the clusters 304).

In at least some aspects, the path determination module 307 may apply a statistical supervised learning technique comprising linear regression techniques to determine progression paths for users considered similar to the current user having the requesting user profile 305. The linear regression utilizes a linear model which finds a line best fitted to the data points available on a plot of profile attributes provided for each user. That is, the plot may be of output profile states reached over a period of time and associated profile attributes for that duration of time thereby predicting and modelling a relationship between profile attribute and user events or profile status changes by fitting a linear equation to observed data. Thus, the linear regression performed by the path determination module 307 predicts a quantitative variable by determining a linear relationship with one or more independent features (e.g. profile attributes in the requesting user profile 305 and the user profiles 302). In this manner the path determination module 307 may further determine which independent variable, e.g. profile attribute of the user plays a significant role in predicting the dependent variable, e.g. a profile status for the user such as an employee career related event.

For example, the linear regression applied by the path determination module 307 may be used to identify attributes from the requesting user profile 305 and compare them to other known profiles or journeys, such as those belonging to a similar cluster group defined by the clusters 304. In at least some aspects, such linear regression analysis may thus form at least part of the consideration for recommendations 303.

The determination of the contribution of profile attributes for profile changes (and thus key profile attributes) and the relevant progression path taken by a user or group of users considered similar to the requesting user profile 305 as defined by the clusters 304 is used along with the available profile states 306 by a recommender 308 to provide one or more recommendations 303 of online actions to be taken. The recommendation module 206 may communicate such recommendations 303 such as via a communication device 222 of FIG. 2 for display on a user interface 107 of the requesting computing device 106. In some aspects, the recommendation 303 may include links or access to one or more software applications provided by the application retrieval module 208 to facilitate such recommended actions to be performed. As illustrated in FIG. 3, the requesting computing device 106 may display in a first view portion 310 of the user interface 107 display, a set of recommendations along with links to access computing resources for performing such recommendations including access to available application resources. A second view portion 312 may display additional input/output user interface controls such as "accept" or "deny" which may be configured for receiving user input on the relevance and interest of the user for the displayed recommendations 303. Such user input may be fed back into the recommendation module 206 for updating subsequent user recommendations.

Referring generally to FIGS. 1-3, in at least some embodiments, the profile attributes provided in user profiles 302 are used as input to an unsupervised machine learning model such as the clustering module 204' to create clusters of employees/users having similar profile attributes as provided via a set of clusters 304. In one aspect, the clustering performed by the clustering module 204' and the path determination module 307 may further be used to detect anomalies of behavior in the users—e.g. one employee may have progressed beyond others while there was no material profile attribute differences between that employee and others within the cluster who did not progress to a different opportunity. The clusters 304 may thus be used for anomaly determination and/or recommendation scoring via the recommendation module 206—e.g. dynamic generation of opportunities.

Thus, referring generally to FIGS. 1-3, in at least some embodiments, once the clustering is performed by the clustering module 204' to provide the clustering groups, shown as clusters 304 that each of the users (e.g. employees) belongs to, then modelling may be applied by the recommendation module 206 to predict and provide recommendations for such users of the environment 100 (e.g. employees) that belong to a certain cluster 304 based on the similarity of their profiles or behaviours to other users or employees in that cluster 304 and the progression path for those employees, which may be determined via the path determination module 307.

In at least some embodiments, the recommendation module 206 may thus be configured to provide context based recommendations 303 on a visual display dashboard screen of a requesting computer device 106 such as the user interface 107. This process may include using linear regression techniques to identify attributes from the employee's profiles (e.g. progression paths) and comparing them to other similar known profiles over a period of time (e.g. as determined from similar clusters). The recommendation module 206 may also be configured to learn and revise recommendations output such as the recommendations 303 for online actions (e.g. training, education, roles, opportunities, performance goals, etc.) based on learning through employee feedback/inputs, behaviour and patterns such as that received via the user interface 107. In some aspects, the recommendations 303 may also be displayed along with a reasoning for the recommendation (e.g. you are similar to employee Y and Z as you share these similar characteristics and each of those employees has progressed by taking the following courses A-C having the associated resource links).

Advantageously, in at least some aspects, the recommendations provided are dynamically performed in a quick, completely automated manner, and may be run periodically (or upon change of events related to an employee or other similar employees) to generate a report in order to provide the visualized recommendations to employees on a timely basis. This example provides a visualization of hidden information in a manner that is accurate and easily accessible by the requesting computing device 106.

Figure 4:
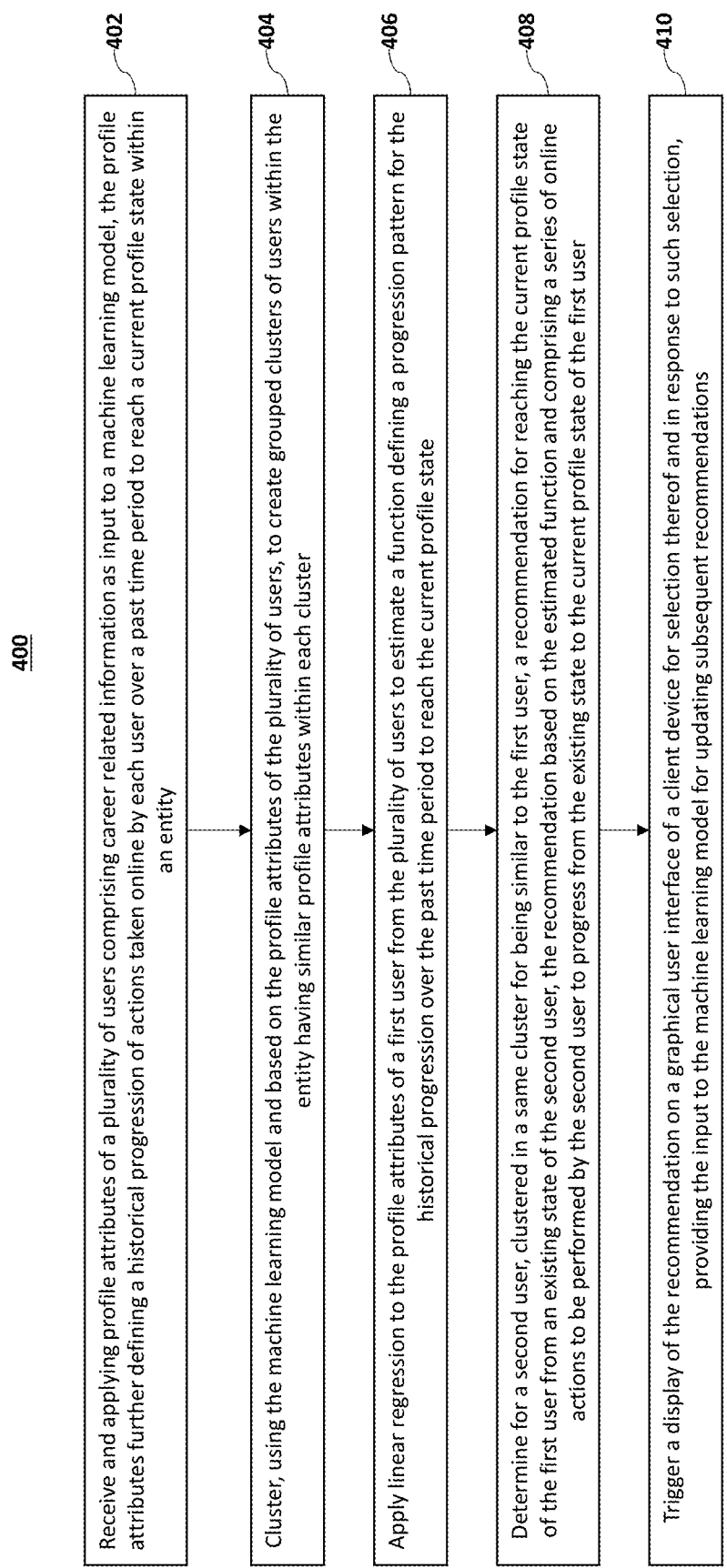
FIG. 4 is a flowchart illustrating example operations of a recommendation system, in accordance with one or more aspects of the present disclosure.

FIG. 4 shows an example process for generating recommendations for online actions based on user profiles and behaviors. The example flowchart of operations 400 in FIG. 4 may be performed by a computing device of the environment 100, such as the recommendation system 102 (also shown in further details in FIGS. 2-3). The computing device may comprise at least one processor configured to communicate with a display such as on an external device provided by the requesting computing device 106 to trigger the display of the recommendations 303 and receive feedback therefrom, where applicable. Additionally, the computing device may store instructions in a non-transient storage device (e.g. see storage device 220 of FIG. 2), which when executed by a processor (e.g. processor 218) configure the computing device to perform operations such as operations 400.

At a first operation step 402, the computing device, e.g. the recommendation system 102, is configured to receive and apply profile attributes of a plurality of users comprising career related information as input to a machine learning model. An example of such a machine learning model is shown as a similarity recognition module 204 or the clustering module 204' in FIGS. 2-3. The profile attributes (e.g. metadata provided in the user profiles 302 and/or historical profile information repository 214), define a historical progression of actions taken online by each user over a past time period to reach a corresponding current profile state for the respective user within an entity. For example, the user profiles 302, may store profile attribute information for each user such as but not limited to current profile status, prior profile status including associated timing information, user identification information, current roles held, educational and professional status, performance metrics, seniority information, competency assessment results, etc. The user profiles 302 may also store user event information such as profile status changes, including timing information and associated other profile attribute changes which may have resulted in the profile status change.

At a second operation step 404, the computing device, e.g. the recommendation system 102 and particularly the similarity recognition module 204 and/or the clustering module 204', is configured to cluster using the machine learning model and based on the profile attributes of the plurality of users, to create grouped clusters of users within the entity having similar profile attributes within each cluster. FIG. 3 illustrates such a flow of operations in generating the clusters 304 which may be based upon the requesting user profile 305 and the other user profiles 302 having profiles within the environment 100 of FIG. 1. Examples of such clustering techniques performed by the clustering module 204' were previously described including using centroid based clustering, hierarchical clustering or distribution based clustering to group the user profiles into similar clusters based on calculating respective similarity distance metrics. The calculation of similarity distance to divide the large group of user profiles into smaller groups so that the relevant profile attributes within each cluster are relatively similar may be performed using for example, any one of: Euclidean distance, Hamming, Manhattan, and Minkowski distance measures.

At a third operation step 406, the computing device, e.g. the recommendation system 102, is configured to apply linear regression to the profile attributes of a first user from the plurality of users (e.g. a user from the user profiles 302 based on the clusters 304 considered to be from the same cluster group as the requesting user profile 305) to estimate a function and associated key profile attribute indicators defining a progression pattern for the historical progression over the past time period to reach the current profile state. In one example, the cluster group may be the first cluster group A. As described earlier, such linear regression and estimation of the function, which links and predicts the relationship between each of the profile attributes to the profile events (e.g. profile status changes occurring over time) may be performed by the path determination module 307 of FIG. 3. Although the third operation step 406 refers to applying linear regression to the profile attributes of a first user, it may be understood that in some aspects, linear regression may be applied to a group of users within a same grouped cluster (e.g. first cluster group A) of the output clusters 304 as considered for being the same group as the requesting user profile 305 such as to determine the linear regression function and relationship between profile attributes and profile status changes over a period of time for the grouped cluster of users.

At a fourth operation step 408, the recommendation system 102 is configured to determine for a second user (e.g. the requesting user from which the query is initiated for recommendations having the requesting user profile 305), that belongs to the same cluster as the first user (e.g. the first cluster group A), a recommendation for subsequent online actions to be taken to reach a desired target state for the second user from a current existing state of the first user. For example, such a target state for the second user may be defined from the query received from the requesting computing device 106 or may be automatically defined as the current profile state of a first user (or a clustered set of users in the same cluster as the first user) which is ahead of the current profile state of the second user. An example is shown in FIG. 3 of the recommendations 303 generated from the recommendation module 206 for the requesting user (e.g. the second user) having requesting user profile 305. In at least some embodiments, the recommendation generated is provided via the recommender 308 by considering the estimated function or linear regression relationship determined via the path determination module 307 and comprises one or more online actions by the second user to perform to progress from the existing state of the second user to a desired target state, e.g. the current profile state of the first user (e.g. as considered to be within a similar cluster as the second user as per the clusters 304).

In at least some implementations, the recommender 308 may also consider available profile states 306 in generating the recommendations 303. For example, if a desired target state for the second user is not available as per the available profile states 306, then the recommender 308 may be configured to determine and suggest an alternate profile state depending on the available profile states 306 thereby to retrieve progression patterns and key profile attributes for such progression from the existing state of the second user to the alternate profile state which is considered as available.

In yet another alternate embodiment, the recommendations 303 may further trigger the retrieval and access of one or more applications for achieving such recommended actions as retrieved via the application retrieval module 208 from stored applications such as within the application repository 216 or via links to external applications for download and access.

At a fifth operation step 410, once the recommendations are generated and in at least some embodiments, the recommendation system 102 may be configured to additionally trigger the generation of a display of the recommendation(s) on a graphical user interface of a client device requesting the recommendation such as the requesting computing device 106 of FIGS. 1-3. An example of such a display is shown in the user interface 107 of FIG. 3 displaying an example dashboard along with the recommendations.

In at least some aspects, the recommendation system 102 monitors the requesting computing device 106 such as to query whether a selection of the recommendation and performing one or more of the online actions (e.g. downloading the relevant computer applications etc.) has occurred. For example, this may be triggered by one or more recommended applications being downloaded via the application retrieval module 208. In response to such selection on the requesting computing device 106, the recommendations selected and the online actions performed are fed back into the machine learning models provided in the recommendation system 102, and may be included in the requesting user profile 305 as indicative of online user behaviours such that the machine learning models within the recommendation module 206 may learn and adjust the models to account for such feedback (e.g. the clustering module 204' and/or the linear regression performed by the path determination module 307) and for generating subsequent recommendations accordingly.

In some embodiments, the recommendation system 102 generates a reasoning for the recommendation 303 and the corresponding online actions in a description portion 311 of the dashboard on the user interface 107. The reasoning may include but not limited to: dynamic generation of features of the historical progression of the first user and an indication of a degree of similarity between the first user and the second user.

Any of the steps, operations, or processes described herein may be performed with one or more hardware and/or software modules, alone or in combination with other devices. In one embodiment, a software module is implemented with a computer program product comprising a computer-readable medium containing computer program code, which can be executed by a computer processor for performing any or all of the steps, operations, or processes described.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of claims.

Various embodiments have been described. These and other embodiments are within the scope of the following claims.

What is claimed is:

1. A computer system for machine learning, the computer system comprising:
    a processor configured to execute instructions;
    a non-transient computer-readable medium comprising instructions that when executed by the processor cause the processor to:
        receive profile attributes of a plurality of users comprising career related information, the profile attributes further defining a historical progression of actions taken online by each user over a past time period to reach a current profile state within an entity;
        apply a clustering machine learning model to the profile attributes of the plurality of users;
        cluster, using the clustering machine learning model and based on the profile attributes of the plurality of users, to create grouped clusters of users within the entity having similar profile attributes within each cluster, each user represented as a node on an output clustering visualization for similarity processing and clustering;
        provide, subsequent to the clustering creating the grouped clusters of users, at least one of the grouped clusters of users to a supervised path determination learning model comprising linear regression;
        apply the supervised path determination learning model comprising linear regression to the profile attributes of a first user from the at least one of the grouped clusters of users to estimate a function defining a progression pattern for the historical progression over the past time period to reach the current profile state;
        access a database of career positions open for application within the entity and retrieving associated description metadata;
        perform natural language processing (NLP) on the description metadata, and the profile attributes of each of the first user and a second user, clustered in a same cluster for being similar to the first user from the at least one of the grouped clusters of users, to determine respective textual context of each;
        determine for the second user a recommendation for reaching the current profile state of the first user from an existing state of the second user, the recommendation based on the estimated function provided from the supervised path determination learning model and a determined textual context of the description metadata of a particular career position having more than a predefined degree of match with the first and second user profile attributes and the recommendations comprising a series of online actions to be performed comprising digital applications to access to progress from the existing state to the current profile state of the first user; and
        trigger a display of the recommendation on a graphical user interface of a client device for selection thereof and in response to an input indicative of the selection, provide the input to the clustering machine learning model and the supervised path determination learning model for learning from and adjusting the clustering machine learning model comprising clustering and the supervised path determination learning model comprising linear regression in response to the selection for updating subsequent recommendations of online actions.

2. The computer system of claim 1, wherein based on the selection of at least one of the online actions, the instructions further cause the processor to: update the existing state to a target state defined by the current profile state of the first user.

3. The computer system of claim 2, wherein the target state is defined as a state that is between the existing state and the current profile state of the first user.

4. The computer system of claim 1, wherein the profile attributes for the users provide metadata characterizing a career profile for each user and further comprises:
    career related progression patterns for each of the users to move from a first profile state to another along with associated timing information;
    training status of each of the users obtained over the past time period; and
    performance metrics of each of the users within the entity and provided on the graphical user interface and certifications taken by each of the users.

5. The computer system of claim 1, wherein the clustering machine learning model uses an unsupervised learning model.

6. The computer system of claim 1, wherein the recommendations include attributes from the first user's historical progression indicative of a career journey from a prior state to the current profile state for the first user, the attributes including an indication of actions performed comprising: certifications completed, training status changes, and performance metrics.

7. The computer system of claim 6, wherein the instructions further configure the processor to:
generate a reasoning for the recommendation and corresponding online actions, the reasoning including features of the historical progression of the first user and an indication of a degree of similarity between the first user and the second user.

8. The computer system of claim 7 wherein the degree of similarity is dependent upon the clustering of users to determine the degree that the first user and the second user fall into a similar cluster.

9. A computer-implemented machine learning method, the method comprising:
receiving profile attributes of a plurality of users comprising career related information, the profile attributes further defining a historical progression of actions taken online by each user over a past time period to reach a current profile state within an entity;
applying a clustering machine learning model to the profile attributes of the plurality of users; clustering, using the clustering machine learning model and based on the profile attributes of the plurality of users, to create grouped clusters of users within the entity having similar profile attributes within each cluster, each user represented as a node on an output clustering visualization for similarity processing and clustering;
providing, subsequent to the clustering creating the grouped clusters of users, at least one of the grouped clusters of users to a supervised path determination learning model comprising linear regression;
applying the supervised path determination learning model comprising linear regression to the profile attributes of a first user from the at least one of the grouped clusters of users to estimate a function defining a progression pattern for the historical progression over the past time period to reach the current profile state;
accessing a database of career positions open for application within the entity and retrieving associated description metadata;
performing natural language processing (NLP) on the description metadata, and the profile attributes of each of the first user and a second user, clustered in a same cluster for being similar to the first user from the at least one of the grouped clusters of users, to determine respective textual context of each;
determining for the second user a recommendation for reaching the current profile state of the first user from an existing state of the second user, the recommendation based on the estimated function provided from the supervised path determination learning model and a determined textual context of the description metadata of a particular career position having more than a predefined degree of match with the first and second user profile attributes and the recommendations comprising a series of online actions to be performed by the second user comprising digital applications to access to progress from the existing state to the current profile state of the first user; and
triggering a display of the recommendation on a graphical user interface of a client device for selection thereof and in response to an input indicative of the selection, providing the input to the clustering machine learning model and the supervised path determination learning model for learning from and adjusting the clustering machine learning model comprising clustering and the supervised path determination learning model comprising linear regression in response to the selection for updating subsequent recommendations of online actions.

10. The method of claim 9, wherein based on the selection of at least one of the online actions, further performing: updating the existing state to a target state defined by the current profile state of the first user.

11. The method of claim 10, wherein the target state is defined as a state that is between the existing state and the current profile state of the first user.

12. The method of claim 9, wherein the profile attributes for the users provide metadata characterizing a career profile for each user and further comprises:
career related progression patterns for each of the users to move from a first profile state to another along with associated timing information;
training status of each of the users obtained over the past time period; and
performance metrics of each of the users within the entity and provided on the graphical user interface and certifications taken by each of the users.

13. The method of claim 9, wherein the clustering machine learning model uses an unsupervised learning model.

14. The method of claim 9, wherein the recommendations include attributes from the first user's historical progression indicative of a career journey from a prior state to the current profile state for the first user, the attributes including an indication of actions performed comprising: certifications completed, training status changes, and performance metrics.

15. The method of claim 14, further comprising:
generating a reasoning for the recommendation and the corresponding online actions, the reasoning including features of the historical progression of the first user and an indication of a degree of similarity between the first user and the second user.

16. The method of claim 15 wherein the degree of similarity is dependent upon the clustering of users to determine the degree that the first user and the second user fall into a similar cluster.

17. A non-transitory computer-readable medium containing computer program code that is executable by a processor for the processor to perform the steps of:
receiving profile attributes of a plurality of users comprising career related information, the profile attributes further defining a historical progression of actions taken online by each user over a past time period to reach a current profile state within an entity;
applying a clustering machine learning model to the profile attributes of the plurality of users;
clustering, using the clustering machine learning model and based on the profile attributes of the plurality of users, to create grouped clusters of users within the entity having similar profile attributes within each cluster, each user represented as a node on an output clustering visualization for similarity processing and clustering;
provide, subsequent to the clustering creating the grouped clusters of users, at least one of the grouped clusters of users to a supervised path determination learning model comprising linear regression;

applying the supervised path determination learning model comprising linear regression to the profile attributes of a first user from the at least one of the grouped clusters of users to estimate a function defining a progression pattern for the historical progression over the past time period to reach the current profile state;

accessing a database of career positions open for application within the entity and retrieving associated description metadata;

performing natural language processing (NLP) on the description metadata, and the profile attributes of each of the first user and a second user, clustered in a same cluster for being similar to the first user from the at least one of the grouped clusters of users, to determine respective textual context of each;

determining for the second user a recommendation for reaching the current profile state of the first user from an existing state of the second user, the recommendation based on the estimated function provided from the supervised path determination learning model and a determined textual context of the description metadata of a particular career position having more than a predefined degree of match with the first and second user profile attributes and the recommendations comprising a series of online actions to be performed comprising digital applications to access to progress from the existing state to the current profile state of the first user; and triggering a display of the recommendation on a graphical user interface of a client device for selection thereof and in response to an input indicative of the selection, providing the input to the clustering machine learning model and the supervised path determination learning model for learning from and adjusting the clustering machine learning model comprising clustering and the supervised path determination learning model comprising linear regression in response to the selection for updating subsequent recommendations of online actions.

* * * * *